US012147191B2

(12) United States Patent
Kano et al.

(10) Patent No.: US 12,147,191 B2
(45) Date of Patent: Nov. 19, 2024

(54) TONER AND TWO-COMPONENT DEVELOPER

(71) Applicant: SHARP KABUSHIKI KAISHA, Osaka (JP)

(72) Inventors: Tadanori Kano, Sakai (JP); Takao Yamada, Sakai (JP); Hiroki Maeda, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 626 days.

(21) Appl. No.: 17/491,283

(22) Filed: Sep. 30, 2021

(65) Prior Publication Data

US 2022/0113646 A1 Apr. 14, 2022

(30) Foreign Application Priority Data

Oct. 9, 2020 (JP) ................................ 2020-171247
Sep. 14, 2021 (JP) ................................ 2021-149721

(51) Int. Cl.
*G03G 9/097* (2006.01)
*G03G 9/08* (2006.01)

(52) U.S. Cl.
CPC ....... *G03G 9/09725* (2013.01); *G03G 9/0819* (2013.01); *G03G 9/0825* (2013.01); *G03G 9/09716* (2013.01)

(58) Field of Classification Search
CPC ........... G03G 9/09708; G03G 9/09725; G03G 9/09716
See application file for complete search history.

(56) References Cited

U.S. PATENT DOCUMENTS

2005/0058926 A1 3/2005 Kawakami et al.
2019/0033735 A1* 1/2019 Tasaki ................ G03G 9/09716

FOREIGN PATENT DOCUMENTS

JP 2009-511987 * 3/2009 ........... G03G 15/162
JP 4594010 B2 12/2010
JP 4944980 B2 6/2012
JP 2018-020919 A 2/2018

OTHER PUBLICATIONS

Translation of JP 2009-511987.*

* cited by examiner

*Primary Examiner* — Peter L Vajda
(74) *Attorney, Agent, or Firm* — ScienBiziP, P.C.

(57) ABSTRACT

The toner includes an external additive adhering to the surface of a toner particle. The external additive contains fine powder in which the surface of a core derived by addition of silica to strontium titanate is hydrophobized with a silane compound, and silica.

8 Claims, 2 Drawing Sheets

WITH REDUCED AMOUNT OF A CHARGE ADJUSTER

WITH INCREASED AMOUNT OF A CHARGE ADJUSTER

WITH REDUCED AMOUNT OF A CHARGE ADJUSTER

WITH INCREASED AMOUNT OF A CHARGE ADJUSTER

WITH REDUCED AMOUNT OF A CHARGE ADJUSTER

WITH INCREASED AMOUNT OF A CHARGE ADJUSTER

TONER AND TWO-COMPONENT DEVELOPER

BACKGROUND OF THE INVENTION

Field of the Invention

The present invention relates to a toner, and a two-component developer.

Description of the Background Art

Toner (toner for electrostatic charge image development) used in image-forming apparatuses, such as copying machines, multifunction machines, printers, and facsimile apparatuses, with use of an electrophotographic system usually has an external additive adhered to the surface of a toner particles. A charge adjuster is an external additive to be added for controlling chargeability of toner.

Toners containing fine powder of strontium titanate as a charge adjuster have been known previously (e.g., Japanese Patent No. 4594010 and Japanese Patent No. 4944980). Japanese Patent Application Laid-Open Publication No. 2018-20919 also discloses an external additive for toner in which strontium titanate-based fine particles that meet specific conditions are coated with alkoxysilane or the like.

Fine powder of strontium titanate has a lower resistance value than the toner matrix particles (toner particles before addition of an external additive), and works to propagate negative charge locally charged on the toner surface to the surrounding toner particles or to release it into the air. A toner to which fine powder of strontium titanate is added has a smaller absolute value of charge amount under both high-humidity and low-humidity environments relative to a toner without the addition.

However, toners containing fine powder of strontium titanate as a charge adjuster have a problem in that increase in the additive amount of fine powder leads to too small absolute value of charge amount under a high-humidity environment, loss of control of image density, and increase in fog. Conversely, there is a problem in that reduction in the additive amount of fine powder leads to too large absolute value of charge amount under a low-humidity environment and large difference of charge amount between a toner in a developer and a supplemental toner, thus making the supplemental toner less likely to mix with a developer in a developer tank and increasing fog by scattering.

Therefore, toners containing fine powder of strontium titanate as a charge adjuster have had a problem of inability to fully inhibit generation of fog under at least one of low-humidity and high-humidity environments.

SUMMARY OF THE INVENTION

The present invention was made based on the circumstances described above, and one of its objects is to provide a toner and a developer capable of inhibiting generation of fog under both low-humidity and high-humidity environments, with reference to a toner containing fine powder of strontium titanate.

The inventors earnestly investigated for solving the problem described above; and consequently found that a fog value can be inhibited to a lower level under both low-humidity and high-humidity environments by adhering fine powder in which a core derived by addition of silica that exhibits negative chargeability to strontium titanate is hydrophobized with a silane compound, and silica onto the surface of a toner particle; and finally completed the present invention.

In other words, the toner according to an embodiment of the present invention is a toner including an external additive adhering to the surface of a toner particle, and the external additive is characterized by containing fine powder in which the surface of a core derived by addition of silica to strontium titanate is hydrophobized with a silane compound, and silica.

Furthermore, the developer according to an embodiment of the present invention is a developer including the toner according to an embodiment of the present invention and a carrier, and is characterized by having a current value of 10 μA or less upon application of a voltage of 300 V from the end of a carrier magnetic chain of 1 mm in length to the opposite end.

The present invention can provide a toner and a developer capable of inhibiting generation of fog under both low-humidity and high-humidity environments, with reference to a toner containing fine powder of strontium titanate.

DESCRIPTION OF THE PREFERRED EMBODIMENTS

Figure 1:
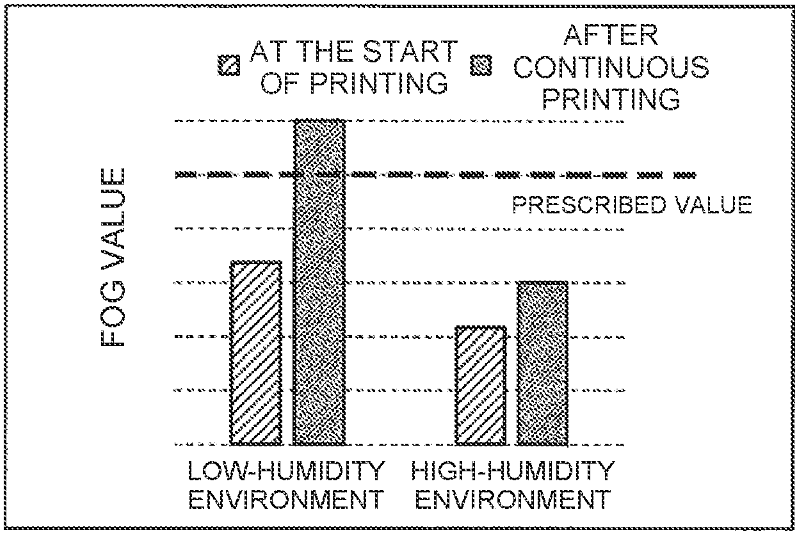
FIG. 1 shows fog values in use of strontium titanate as a charge adjuster.
Figure 1:
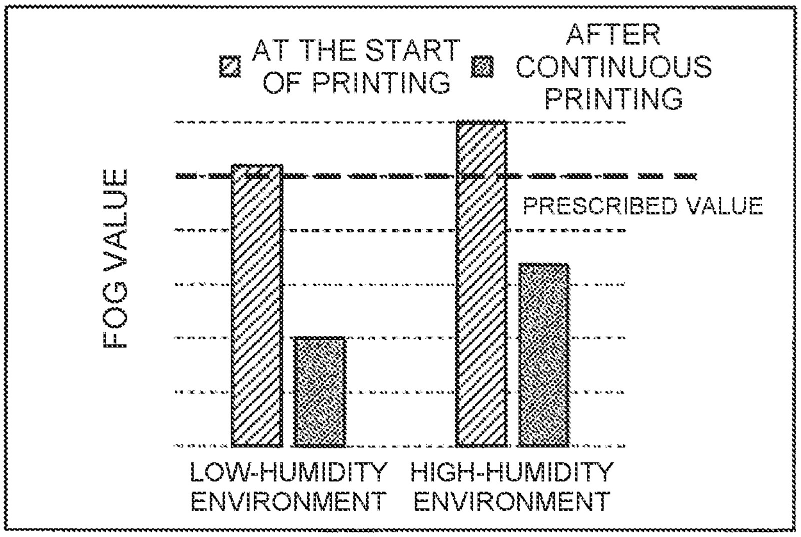

The present invention includes a toner and a developer. These will now be described in detail below.

Toner

The toner according to an embodiment of the present invention is a toner including an external additive adhering to the surface of a toner particle. Furthermore, an optional component may be included in the range of not impairing an effect of the present invention, as required. The volume mean particle diameter of primary particles of toner particles is not particularly limited, but toner particles having a volume mean particle diameter of 4 μm or more to 8 μm or less can be exemplified.

Examples of binding resin in the toner according to an embodiment of the present invention include a polyester-based resin, a polystyrene-based resin such as a styrene-acrylic resin, a (meth)acrylic ester-based resin, a polyolefin-based resin, a polyurethane-based resin, and an epoxy-based resin; one of these may be used alone, or two or more types may be used in combination.

Binding Resin

A polyester resin used for the binding resin can be commonly obtained by polycondensation reaction of one or more types selected from dihydric alcohol components and trihydric or higher polyhydric alcohol components, and one or more types selected from dicarboxylic acids and tricarboxylic or higher polycarboxylic acids, through an esterification reaction or an ester exchange reaction by a known method.

The condition in the condensation polymerization reaction only needs to be set appropriately depending on reactivity of a monomer component, and furthermore, the reaction only need to be terminated at the time when a polymer has a preferred physical property. For example, reaction temperature is about 170-250° C. and reaction pressure is about 5 mmHg to normal pressure.

Examples of the dihydric alcohol components include alkylene oxide adducts of bisphenol A such as polyoxypropylene (2.2)-2,2-bis(4-hydroxyphenyl)propane, polyoxypropylene (3.3)-2,2-bis(4-hydroxyphenyl)propane, polyoxypropylene (2.0)-2,2-bis(4-hydroxyphenyl)propane, polyoxypropylene (2.0)-polyoxyethylene (2.0)-2,2-bis(4-hydroxyphenyl)propane, and polyoxypropylene (6)-2,2-bis(4-hydroxyphenyl)propane; diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, and polytetramethylene glycol; bisphenol A; propylene adducts of bisphenol A; ethylene adducts of bisphenol A; and hydrogenated bisphenol A.

Examples of trihydric or higher polyhydric alcohol components include sorbitol, 1,2,3,6-hexanetetrol, 1,4-sorbitan, pentaerythritol, dipentaerythritol, tripentaerythritol, sucrose (cane sugar) 1,2,4-butantriol, 1,2,5-pentantriol, glycerol, 2-methylpropantriol, 2-methyl-1,2,4-butantriol, trimethylol ethane, trimethylol propane, and 1,3,5-trihydroxymethylbenzene.

In the present invention, one of the dihydric alcohol components and trihydric or higher polyhydric alcohol components described above may be used alone, or two or more types may be used in combination.

Examples of the dicarboxylic acids include maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, malonic acid, n-dodecenyl succinic acid, n-dodecyl succinic acid, n-octylsuccinic acid, isooctenylsuccinic acid, isooctylsuccinic acid, and acid anhydrides, lower alkyl esters thereof.

Examples of the tricarboxylic or higher polycarboxylic acids include 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butane tricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromeritic acid, Empol trimeric acid, and acid anhydrides, lower alkyl esters thereof.

In the present invention, one of the dicarboxylic acids and tricarboxylic or higher polycarboxylic acids described above may be used alone, or two or more types may be used in combination.

In the toner according to an embodiment of the present invention, the binding resin preferably contains a crystalline polyester resin and a non-crystalline polyester resin. The crystalline polyester resin is dispersed in the non-crystalline polyester resin.

In the present invention, the crystalline resin and the non-crystalline resin are distinguished by crystallinity indices; a resin having a crystallinity index in the range of 0.6 or more to 1.5 or less is defined as the crystalline resin, and a resin having a crystallinity index in the range of less than 0.6 or more than 1.5 is defined as the non-crystalline resin. A resin having a crystallinity index of more than 1.5 is non-crystalline, and meanwhile, a resin having a crystallinity index of less than 0.6 has low crystallinity and a large amount of non-crystalline parts.

Incidentally, crystallinity index is a physical property to be an index of degree of crystallization of a resin, and is defined by a ratio of softening temperature to endothermic maximum peak temperature (softening temperature/endothermic maximum peak temperature). Here, endothermic maximum peak temperature designates a temperature of a peak located closest to the highest temperature among endothermic peaks observed. The crystalline polyester resin is set to have a maximum peak temperature defined as a melting point, and the non-crystalline polyester resin is set to have a peak closest to the highest temperature defined as a glass-transition point.

The degree of crystallization can be controlled by adjusting a type and ratio of a raw material monomer, and a production condition (e.g., reaction temperature, reaction time, cooling rate), and the like.

Crystalline Polyester Resin

The crystalline polyester resin is a polyester resin having a crystallinity index of 0.6-1.5, but is preferably a polyester resin having a crystallinity index of 0.8-1.2. In addition, the crystalline polyester resin can be obtained by, e.g., polycondensation of polybasic acid and polyhydric alcohol. Production can be made by a known method described in, e.g., Japanese Patent Application Laid-Open Publication No. 2006-113473.

Examples of polyhydric alcohols include ethylene glycol, 1,2-propylene glycol, 1,3-propylene glycol, 1,4-butanediol, 1,5-pentanediol, 1,6-hexanediol, 1,7-heptanediol, 1,8-octanediol, neopentyl glycol, and 1,4-butenediol, but it is preferable to use a polyhydric alcohol that promotes crystallinity of a resin, such as an aliphatic diol with a carbon number of 2-8. Here, such polyhydric alcohols may be used alone or in combination of two or more types.

In view of improving crystallinity of a resin, the content of aliphatic diol having a carbon number of 2-8 in polyhydric alcohol is preferably 80 mol % or more; furthermore, in use of two types of aliphatic diols having a carbon number of 2-8, the content of one aliphatic diol having a carbon number of 2-8 is preferably 70 mol % or more in polyhydric alcohol.

Examples of polybasic acids include aliphatic dicarboxylic acids having a carbon number of 2-30, preferably 2-8, such as fumaric acid, adipic acid, oxalic acid, malonic acid, maleic acid, fumaric acid, citraconic acid, itaconic acid, glutaconic acid, succinic acid, sebacic acid, azelaic acid, n-dodecylsuccinic acid, and n-dodecenylsuccinic acid; aromatic dicarboxylic acids such as phthalic acid, isophthalic acid, and terephthalic acid; alicyclic dicarboxylic acids such as cyclohexanedicarboxylic acid; and tricarboxylic or higher polycarboxylic acids such as trimellitic acid and pyromellitic acid. For the purpose of obtaining high degree of crystallinity (crystallinity index), aliphatic dicarboxylic acid is preferable, and aliphatic dicarboxylic acid having a carbon number of 2-8 is more preferable. Here, such polybasic acids may be used alone or in combination of two or more types.

The acid value of the crystalline polyester resin is preferably 5 mg KOH/g or more to 20 mg KOH/g or less. Meanwhile, the hydroxyl value of the crystalline polyester resin is preferably 5 mg KOH/g or more to 20 mg KOH/g or less.

The molecular weight of the crystalline polyester resin is preferably 5000 or more to 100000 or less by weight-average molecular weight (Mw), and preferably 3000 or more to 20000 or less by number-average molecular weight (Mn). In the present invention, weight-average molecular weight and number-average molecular weight are values measured by gel permeation chromatography (GPC), which employs chloroform as a mobile phase and employs polystyrene as a reference substance.

The softening temperature of the crystalline polyester resin is preferably such that the crystalline polyester resin is to have a temperature of 60° C. or more to 105° C. or less.

In the toner according to an embodiment of the present invention, the content of the crystalline polyester resin is not particularly limited, but is preferably 1% by mass or more to 20% by mass or less, and more preferably 2% by mass or more to 20% by mass or less in the toner particles. The content of the crystalline polyester resin at the above-described lower limit or more can facilitate improvement of low-temperature fixability. The content of the crystalline polyester resin at the above-described upper limit or less can facilitate improvement of heat-resistant preservability of the toner.

Non-Crystalline Polyester Resin

The non-crystalline polyester resin is a polyester resin having a crystallinity index of less than 0.6 or more than 1.5, but is preferably a polyester resin having a crystallinity index of more than 1.5. In addition, the non-crystalline polyester resin can be obtained by, e.g., polycondensation of polybasic acid and polyhydric alcohol.

As polybasic acid, known monomers for polyester synthesis can be used, and examples include aromatic carboxylic acids such as terephthalic acid, isophthalic acid, phthalic anhydride, trimellitic acid, trimellitic anhydride, pyromellitic acid, and naphthalenedicarboxylic acid; aliphatic carboxylic acids such as maleic anhydride, fumaric acid, succinic acid, alkenyl succinic anhydride, and adipic acid; and methyl esterified compounds of such polybasic acids. Such polybasic acids may be used alone or in combination of two or more types.

Also as polyhydric alcohol, known monomers for polyester synthesis can be used, and examples include aliphatic polyhydric alcohols such as ethylene glycol, propylene glycol, butanediol, hexanediol, neopentyl glycol, and glycerin; alicyclic polyhydric alcohols such as cyclohexanediol, cyclohexanedimethanol, and hydrogenated bisphenol A; and aromatic diols such as an ethylene oxide adduct of bisphenol A and a propylene oxide adduct of bisphenol A. Such polyhydric alcohols may be used alone or in combination of two or more types.

A polycondensation reaction of polybasic acid and polyhydric alcohol can be performed in accordance with a common method, e.g., is carried out by contacting polybasic acid with polyhydric alcohol in the presence or absence of an organic solvent and in the presence of polycondensation catalyst (such as tin octanoate); and then the reaction is terminated once the acid value, softening temperature, and the like of the polyester thus generated reach desired values. This provides the non-crystalline polyester resin. Use of a methyl esterified compound of polybasic acid as a part of polybasic acid provides methanol-eliminating polycondensation reaction. In this polycondensation reaction, appropriate change of the compounding ratio of polybasic acid to polyhydric alcohol, the reaction rate, or the like allows, e.g., adjusting the content of carboxyl groups on the end terminal of polyester, and in turn modifying a characteristic of the non-crystalline polyester resin thus obtained. In addition, use of trimellitic anhydride as polybasic acid allows easy introduction of a carboxyl group into the main chain of polyester.

Additionally, a polycondensation reactions of polybasic acid and polyhydric alcohol is performed under a temperature condition of commonly about 150° C.-300° C., and preferably about 170° C.-280° C. Furthermore, the polycondensation reaction described above can be performed under normal pressure, reduced pressure, or applied pressure, but it is preferable to appropriately adjust pressure inside a system along with tracing progress of the polycondensation reaction by physical property values (e.g., acid value, melting point) or a stirring torque or power value of a reactor.

The acid value of the non-crystalline polyester resin is preferably 10 KOH mg/g or more to 30 KOH mg/g or less, and more preferably 15 KOH mg/g or more to 25 KOH mg/g or less.

The non-crystalline polyester resin has preferably a weight-average molecular weight (Mw) of 5000 or more to 50000 or less, and preferably a number-average molecular weight (Mn) of 1000 or more to 10000 or less. In the present invention, weight-average molecular weight and number-average molecular weight are values measured by gel permeation chromatography (GPC), which employs tetrahydrofuran (THF) as a mobile phase and employs polystyrene as a reference substance.

The glass-transition temperature (Tg) of the non-crystalline polyester resin is preferably 55° C. or more to 70° C. or less.

In the toner according to an embodiment of the present invention, the content of the non-crystalline polyester resin is not particularly limited, but is preferably 67% by mass or more to 89% by mass or less in the toner particles.

Other Internal Additives

Additionally, the toner particle may contain a colorant, a charge control agent, a mold lubricant, and the like. Constituents other than an external additive are also collectively referred to as an internal additive. As the colorant, an organic dye, an organic pigment, an inorganic dye, an inorganic pigment, or the like used in the field of electrophotography can be employed. As the charge control agent, charge control agents for positive charge control and negative charge control used in the field of electrophotography can be employed. As the mold lubricant, wax used in the field of electrophotography can be employed.

External Additive

In the present invention, the external additive contains fine powder in which the surface of a core derived by addition of silica to strontium titanate is hydrophobized with a silane compound, and silica. Containing such fine powder and silica allows the toner according to an embodiment of the present invention to inhibit generation of fog under both low-humidity and high-humidity environments. Incidentally, among the toners according to an embodiment of the present invention, a toner having a toner particle that includes the external additive adhering to the surface is referred to as an externally-added toner, as appropriate herein. In addition, a material in which the surface of a core derived by addition of silica to strontium titanate is hydrophobized with a silane compound may be referred to as silica-added strontium titanate.

In the toner in the present invention, the molar ratio of silicon to titanium Si/Ti in the fine powder described above is preferably 0.03 or more to less than 1.0, and more preferably 0.04 or more to 0.06 or less. Si/Ti indicates the content ratio of silica in the fine powder described above. When Si/Ti is less than the lower limit described above, the negative chargeability is diminished, potentially leading to a larger fog value due to decrease in chargeability under a high-humidity environment. When Si/Ti exceeds the above upper limit, the negative chargeability is enhanced, and adhesiveness between toner and carrier increases due to increase in charge under a low-humidity condition, thus making the toner supplied later less likely to be mixed and allowing it to be developed without sufficient charging; this may cause increase in toner scattering and a larger fog value.

In the toner according to an embodiment of the present invention, the coverage on the toner particle surface with the fine powder described above is preferably 2% or more to 10% or less. The coverage with the fine powder within the above-described range allows a fog value under low-humidity and high-humidity environments to be kept small. When the coverage ratio with the fine powder is less than the lower limit described above, a fog value under a low-humidity environment may be larger. By contrast, when the coverage ratio with the fine powder exceeds the upper limit described above, a fog value under a high-humidity environment may be larger.

In the toner according to an embodiment of the present invention, the coverage with the silica described above on the toner particle surface is preferably 40% or more. The coverage with the silica of 40% or more allows a fog value under a high-humidity environment to be kept small. Here, the sum of the coverage with the silica described above and the coverage with the fine powder described above on the toner particle surface is 100% or less.

In the toner according to an embodiment of the present invention, ratio A, a ratio of the adhesion strength of the fine powder described above to the adhesion strength of the silica described above as calculated by the following formula (1), is preferably 1.1 or less. When a ratio of adhesion strength A exceeds 1.1, fog in high humidity may be deteriorated.

$$A=\text{(Adhesion strength of the silica)}/\text{(Adhesion strength of the fine powder)} \quad (1)$$

A ratio of adhesion strength A is more preferably 0.7 or more to 1.1 or less. Even more preferably, it is 0.8 or more to 1.1 or less. When a ratio of adhesion strength A is less than the lower limit described above, fog in high humidity may be deteriorated. A ratio of adhesion strength A indicates a proportion at which the external additive is embedded in the toner matrix particle surface, and an environmental charging performance is best exhibited in the range described above. When a ratio of adhesion strength A exceeds the upper limit described above, an environmental charging performance may be lost due to the strong embedment of the fine powder.

Moreover, in the toner according to an embodiment of the present invention, resistance value change of toner D, calculated by the following formula (2), is preferably −10 or more. When resistance value change of toner D is less than −10, fog in high humidity may not be improved.

$$D=(B-C)/(b-c) \quad (2)$$

(In formula (2), B is a resistance value of the toner (GΩ) when b mass parts of the fine powder is added to 100 mass parts of the toner particles. C is a resistance value of the toner (GΩ) when c mass parts of fine powder is added to 100 mass parts of the toner particles.)

Resistance value change of the toner D is more preferably −10 or more to −3 or less. Even more preferably, it is −10 or more to −8 or less. When resistance value change of the toner D exceeds the upper limit described above, fog in low humidity may not be improved.

Less dispersion of the fine powder leads to larger change of a resistance value corresponding to change of the additive amount of the fine powder, thus potentially losing an environmental charging performance of the fine powder.

The fine powder in which the surface of a core derived by addition of silica to strontium titanate is hydrophobized with a silane compound preferably has a mean primary particle diameter of 20 nm or more to 60 nm or less. Even more preferably, it is 30 nm or more to 50 nm or less. The mean primary particle diameter of the fine powder within the above-described range allows a fog value under low-humidity and high-humidity environments to be kept small. When the mean primary particle diameter of the fine powder is less than the lower limit described above, a fog value under a high-humidity environment may be larger. By contrast, when the mean primary particle diameter of the fine powder exceeds the upper limit described above, a fog value under a low-humidity environment may be larger.

The toner according to an embodiment of the present invention preferably includes 0.1 mass parts or more to 0.6 mass parts or less of microparticles of zinc stearate having a mean primary particle diameter of 0.5 μm or more to 3 μm or less, as an external additive. Addition of zinc stearate as an external additive allows further improvement of an environmental charging performance of the toner, and in addition, improvement of a cleaning performance of the toner mounted on a photoconductor drum. More preferably, the mean primary particle diameter of the microparticles of zinc stearate is 0.6 μm or more to 2.5 μm or less, and the content is 0.2 mass parts or mote to 0.5 mass parts or less. When the mean primary particle size or content of the microparticles of zinc stearate is out of the range described above, a cleaning performance of the toner mounted on a photoconductor drum may not be improved. In addition, an environmental charging performance of the toner may not also be improved.

The fine powder in which the surface of a core derived by addition of silica to strontium titanate is hydrophobized can be produced by, for example, the procedure shown in the items (1)-(5) below.

(1) Subject metatitanic acid obtained by a sulfuric acid method to deironized bleaching, then desulfurize by adding an aqueous sodium hydroxide solution, followed by neutralization with hydrochloric acid, filtration and washing with water to obtain a washed cake.

(2) Add water to the washed cake to make a slurry, and then add hydrochloric acid to perform peptization. Define this as Solution 1, and mix with Solution 2, an aqueous strontium chloride solution, and Solution 3, an aqueous sodium silicate solution. Set the mixing ratio of Solution 1, Solution 2 and Solution 3 to provide a molar ratio of (Sr+Si)/Ti within the range of 1.18-2.10.

(3) Heat the mixture solution to 90° C. under a nitrogen gas atmosphere, and stir for 2 hours with adding an aqueous sodium hydroxide solution, and then terminate the reaction.

(4) Cool the post-reaction slurry to 50° C., added hydrochloric acid and stirred for 2 hours, and wash the precipitate thus produced, separate by filtration, and then dry.

(5) Pulverize the dried material thus obtained in a blender for 1 minute, and remove coarse powder with a sieve having a mesh opening of 32 μm, and then surface coat the fine powder base thus obtained with a silane coupling agent. Examples of methods of surface coating with a silane coupling agents include surface treatments commonly used in the art with hexamethyldisilazane (HMDS), dimethyldichlorosilane (DDS), octylsilane (OTAS), and polydimethylsiloxane (PDMS).

Silica as an external additive in the present invention is not particularly limited, but is exemplified with a product named "H2000T", manufactured by WACKER Chemie AG, in which fumed silica with a mean particle diameter of 12 nm is surface treated with hexamethyldisilazane; a product named "R974", manufactured by EVONIK Industries AG, in which fumed silica with a mean particle diameter of 12 nm is surface treated with dimethyldichlorosilane; a product named "RX200", manufactured by EVONIK Industries AG, in which fumed silica with a mean particle diameter of 12 nm is surface treated with hexamethyldisilazane; and a product named "R976S" manufactured by EVONIK Industries AG, in which fumed silica with a mean particle diameter of 7 nm is surface treated with dimethyldichlorosilane.

Developer

A developer according to an embodiment of the present invention contains the toner according to an embodiment of the present invention and a carrier. The developer can be produced by mixing the toner and the carrier using a known mixing machine. The weight ratio of the toner to the carrier is not particularly limited, but can exemplified with 3:97-12:88.

The carrier is stirred and mixed with the toner within a developer tank to provide the toner with a desired charge. The carrier also functions as an electrode between a developing apparatus and a photoconductor, and serves to carry the charged toner to an electrostatic latent image on the photoconductor and to form a toner image. The carrier is held on a developing roller of the developing apparatus by magnetic force, affects developing, then returns to the developer tank again, and is stirred and mixed with a new toner again to be repeatedly used until its life-span expired.

The carrier has a carrier core material, and a resin coating layer coating on the carrier core material. The carrier core material is not particularly limited as long as it is used in the field of electrophotography. Particular examples of the carrier core materials include magnetic metals such as iron, copper, nickel, and cobalt, and magnetic metal oxides such as ferrite and magnetite. The volume mean particle diameter of the carrier core material is not particularly limited, but can be exemplified with 30 μm or more to 100 μm or less. The resin coating layer preferably contains a silicone resin or an acrylic resin. Silicone resins can slow down progression of contamination in a carrier coat layer, and is suitable for use in long-life applications.

The developer according to an embodiment of the present invention has a current value of 10 μA or less upon application of a voltage of 300 V from the end of a carrier magnetic chain of 1 mm in length to the opposite end. More preferably, it is 9 μA or less. The current value below the upper limit described above allows a fog value under a high-humidity environment to be kept small. Use of a toner having a higher resistance value of a carrier allows production of a developer with a smaller fog value, compared to a toner without use of the fine powder described above. In the range where the current value is the above-described upper limit or less, the fog value will not increase within the range where the toner is developed normally.

The present invention will now be described on the basis of the examples and comparative examples, but the present invention is not limited by such examples. First, measurements in the examples and the like will be described.

Method for Measuring Coverage of External Additive

An external additive toner was photographed with a scanning electron microscope (SEM) (manufactured by Hitachi High-Tech Corporation, model: S-4800). Model calculation in a projected area was performed using the mean particle diameter and specific gravity of toner particles (toner matrix particles) and the mean particle diameter and specific gravity of each external additive, and the coverage of each of the external additives was derived using the following formula (3).

$$F = \frac{\sqrt{3}}{2\pi} * \frac{\rho_t D}{\rho_i d} * C \quad (3)$$

In the formula (3) described above, D is the mean particle diameter of toner particles, ρt is specific gravity of toner particles, d is the mean particle diameter of an external additive, ρi is specific gravity of an external additive, and C is the number of added mass parts of an external additive.

Method for Measuring Adhesion Strength of External Additive

Adhesion strength of each external additive to toner particles (toner matrix particles) was measured in accordance with the following procedure. Here, silica in the expression "adhesion strength of silica" indicates silica added as an external additive for toner (not a part of fine powder) rather than silica added to a core of fine powder.

(1) Add 2.0 g of toner to 40 mL of an aqueous Triton (polyoxyethylene octylphenyl ether) solution with a concentration of 0.2% by mass and stir for 1 minute.

(2) Irradiate the aqueous solution described above with ultrasonic waves using an ultrasonic homogenizer (manufactured by Nihonseiki Kaisya Ltd., model: US-300T) (output: 40 μA, 4 minutes).

(3) Leave the post-ultrasonication aqueous solution standing for 3 hours to separate the toner from the external additive thus released.

(4) After removal of a supernatant, add about 50 mL of pure water to the precipitation and stir for 5 minutes.

(5) Perform suction filtration using a membrane filter with a pore size of 1 μm (manufactured by Advantech Co., Ltd.)

(6) Dry in vacuo the toner remaining on the filter overnight.

(7) Analyze strength of elements (Si) and (Ti) in the external additive in 1 g of the toner before and after a series of the treatments (1)-(6) described above using a fluorescent X-ray analyzer (manufactured by Rigaku Corporation, model: ZSX Primus II), and calculate adhesion strength of the external additive in accordance with the following formula.

Adhesion strength of silica (%)=[(Si strength after treatment)/(Si strength before treatment)]×100

Adhesion strength of fine powder in which the surface of a core derived by addition of silica to strontium titanate is hydrophobized with a silane compound (%)=[(Ti strength after treatment)/(Ti strength before treatment)]×100

Here, since the silica added to the core of the fine powder described above is about 2-10 mol to strontium titanate, the adhesion strength of the fine powder was calculated based on intensity of the Ti element in the fluorescent X-ray analyzer, as described above.

Then, ratio A, a ratio of the adhesion strength of the fine powder described above to the adhesion strength of the silica was calculated in accordance with the following formula (1).

$A$=(Adhesion strength of silica)/(Adhesion strength of fine powder) (1)

Method for Measuring Resistance Value of Toner

One gram of toner was sealed in a container of φ25 mm and compressed with a force of 20 MPa for 20 seconds to obtain a solid sample of φ25 mm and 2 mm in thickness. A resistance value of the toner was measured for this solid sample using a 2550A type capacitance bridge (manufactured by Andeen-Hagerling, Inc).

The resistance value obtained in this measurement was used to calculate the resistance value change of the toner D in accordance with the following formula (2).

$$D=(B-C)/(b-c) \quad (2)$$

(In formula (2), B is a resistance value of the toner (GΩ) when b mass parts of the fine powder described above is added to 100 mass parts of toner particles. C is a resistance value of the toner (GΩ) when c mass parts of the fine powder is added to 100 mass parts of toner particles.)

Method for Providing Printed Material

A color multifunction printer (manufactured by Sharp Corporation; model: MX-3631) was used as an evaluation machine. In an environmental test room, the evaluation machine was operated under a low-humidity environment (temperature: 25° C., relative humidity: 5%) and under a high-humidity environment (temperature: 25° C., relative humidity: 80%), and 10,000 sheets were printed for an image with 10% part of the printable area of A4 paper filled with cyan toner.

Method for Measuring Fog Value

As described above, the evaluation machine (manufactured by Sharp Corporation, model: MX-3631) was used to print an image with 10% part of the printable area of A4 paper filled with cyan toner, and a colorimeter (manufactured by Nippon Denshoku Industries Co., Ltd., model: ZE6000) was used to measure brightness of a specific position of the image without filling was measured. A difference between this brightness and a brightness measured in advance before printing was used as a fog value.

Method for Evaluating Fog Value

The samples of the Examples and Comparative Examples were placed in the evaluation machine described above, and fog values were measured and evaluated under high-humidity and low-humidity environments as follows.

A fog value at the first sheet of the start of printing was measured, and then 9,998 sheets were printed at a coverage rate of 1%, followed by measuring a fog value of the 10,000th sheet. The fog values were then evaluated according to the following criteria. Here, a prescribed value of fog values indicates a prescribed value defined by the evaluation machine and the evaluation contents.

+++: Excellent (a measured value is 80% or less relative to a prescribed value of fog values).

++: Good (a measured value is more than 80% to 90% or less relative to a prescribed value of fog values).

+: Passed (a measured value is more than 90% to 100% or less relative to a prescribed value of fog values).

−: Failed (a measured value is more than 100% relative to a prescribed value of fog values).

Example 12 in Table 1 below was set to have a prescribed value of 2.0 and exhibited a fog value of 0.9 for the first sheet under a high-humidity environment, thus providing a measured value of 45% and evaluation as "+++: Excellent".

Based on these four ratings (the first sheet under a high-humidity environment, the 10,000th sheet under a high-humidity environment, the first sheet under a low-humidity environment, and the 10,000th sheet under a low-humidity environment), overall rating of the fog values was performed according to the following criteria.

+++: Excellent (all of the four ratings are +++ or ++ and include +++ in three or more ratings).

++: Good (all of the four ratings are +++ or ++ and include +++ in two or less ratings).

+: Passed (None of the four ratings are − but any of them is +).

−: Failed (any of the four ratings is −).

Production of Toner Particles

Toner particles (toner matrix particles) used in the Examples and Comparative Examples were prepared as follows.

First, the following materials were pre-mixed for 5 minutes using an airflow mixer (Henschel mixer, manufactured by Mitsui Mining Co., Ltd. (current Nippon Coke and Engineering Co., Ltd.), model: FM20C) (mixing process):

binding resin: 67% by mass of a non-crystalline polyester resin

20% by mass of a crystalline polyester resin;

colorant: 7% by mass of C.I. Pigment Blue 15:3 (manufactured by DIC Corporation);

lubricant: 5% by mass of monoester-based wax (manufactured by NOF Corporation, product name: WEP-3); and charge control agent: 1% by mass of salicylic acid-based compound (Orient Chemical Industries, Ltd., product name: Bontron E-84).

Next, a melt-kneaded material was obtained by melt kneading using an open-roll continuous kneader (manufactured by Mitsui Mining Co., Ltd. (current Nippon Coke and Engineering Co., Ltd.), model: MOS320-1800) (kneading process).

The setting conditions of the open rolling were a supply part temperature of 130° C. and an emission part temperature of 100° C. in a heating roller, and a supply part temperature of 40° C. and an emission part temperature of 25° C. in a cooling roller. As the heating roller and the cooling roller, rollers having a diameter of 320 mm and an effective length of 1550 mm were employed, and both inter-roller gaps on the supply part and the emission part were set to 0.3 mm. The setting also had a rotation speed of the heating roller of 75 rpm, a rotation speed of the cooling roller of 65 rpm, and a supply of the toner raw material of 5.0 kg/h.

The melt-kneaded material thus obtained was cooled on a cooling belt, and then roughly milled with a speed mill having a screen with <p 2 mm to produce a roughly-milled product. The roughly-milled product thus obtained was finely milled with a jet mill (manufactured by Nippon Pneumatic Mfg. Co., Ltd.; model: IDS-2) to produce a finely-milled product (finely-milling process).

Then, the finely-milled product thus obtained was classified with an elbow jet classifier (Nittetsu Mining Co., Ltd.; model: EJ-LABO) to produce the toner particle (classifying process).

Addition of External Additive to Toner Particles

An external additive was added to the toner particles separately in the first and second addition processes as follows to adhere the external additive to the surface of the toner particles.

Examples 8, 12

First, description will be made for a process of adding the external additive in Examples 8 and 12 in Table 1 below, which has a coverage with silica of 90%, a coverage with fine powder of silica-added strontium titanate of 10%, an adhesion strength ratio A of 0.9, and a resistance value change of −10.

As the first addition process, 100 mass parts of the toner particles and 1.3 mass parts of silica (manufactured by WACKER Chemie AG, product name: H2000T) were put into a container, and the contents in the container were mixed using an FM mixer (manufactured by Nippon Coke and Engineering Co., Ltd., product name: FM-20) at a rotation speed of 2,700 rpm for 2 minutes.

Next, as the second addition process, 1.0 mass parts of fine powder in which the surface of a core derived by addition of silica to strontium titanate is hydrophobized with a silane compound was fed into the container described above and mixed at a rotation speed of 2,700 rpm for 2.2 minutes using an FM mixer to obtain a mixture. The mixture is sieved using a 270 mesh sieve to obtain an externally-added toner.

Here, when microparticles of zinc stearate is used as an additional external additive, toner with externally-added microparticles of zinc stearate is obtained by feeding 0.4 mass parts of microparticles of zinc stearate having a mean primary particle diameter of 1 μm into the container described above, mixing with use of a FM mixer at a rotation speed of 2,700 rpm for 1 minute to obtain a mixture, then sieving the mixture with a 270 mesh sieve, as the third external additive process.

The fine powder used in the second addition process described above were produced according to the procedure shown in the following items (1)-(5) below.

(1) Subject metatitanic acid obtained by a sulfuric acid method to deironized bleaching, then desulfurize by adding an aqueous sodium hydroxide solution, followed by neutralization with hydrochloric acid, filtration and washing with water to obtain a washed cake.

(2) Add water to the washed cake to make a slurry, and then add hydrochloric acid to perform peptization. Define this as Solution 1, and mix with Solution 2, an aqueous strontium chloride solution, and Solution 3, an aqueous sodium silicate solution. Set the mixing ratio of Solution 1, Solution 2 and Solution 3 to provide a molar ratio of (Sr+Si)/Ti of 1.2.

(3) Heat the mixture solution to 90° C. under a nitrogen gas atmosphere, and stir for 2 hours with adding an aqueous sodium hydroxide solution, and then terminate the reaction.

(4) Cool the post-reaction slurry to 50° C., added hydrochloric acid and stirred for 2 hours, and wash the precipitate thus produced, separate by filtration, and then dry.

(5) Pulverize the dried material thus obtained in a blender for 1 minute, and remove coarse powder with a sieve having a mesh opening of 32 μm, and then DDS surface coat the fine powder base thus obtained with a silane coupling agent.

Here, when "R976S" is used instead of "H2000T" as the silica to be fed in the first addition process, it is only necessary to determine a feed amount in accordance with the formula (3) described above; in the above-mentioned case, it should only be 0.7 mass parts.

Examples 1-5, 9-11, 17-20

In Examples 1-5, 9-11, and 17-20, which has an adhesion strength ratio A of 0.9 and a resistance value change of −10 as with the case in Examples 8 and 12, externally-added toner was obtained in the same manner as in Examples 8 and 12 except for changing the number of parts of the external additive to that calculated with the formula (3) described above so as to provide a coverage with the value shown in Table 1.

Example 6

In Example 6, which has an adhesion strength ratio A of 1.2, externally-added toner was obtained in the same manner as in Examples 8 and 12 except for changing a mixing time in the first addition process to 3 minutes.

Example 7

In Example 7, which has a resistance value change D of −12, externally-added toner was obtained in the same manner as in Examples 8 and 12 except for changing a mixing time in the first addition process to 1.3 minutes and a mixing time in the second addition process to 1.4 minutes.

Example 13

In Example 13, which has an adhesion strength ratio A of 1.1, externally-added toner was obtained in the same manner as in Examples 8 and 12 except for changing a mixing time in the first addition process to 2.2 minutes.

Example 14

In Example 14, which has an adhesion strength ratio A of 0.6, externally-added toner was obtained in the same manner as in Examples 8 and 12 except for changing a mixing time in the first addition process to 1.9 minutes.

Example 15

In Example 15, which has a resistance value change D of −9, externally-added toner was obtained in the same manner as in Examples 8 and 12 except for changing a mixing time in the first addition process to 1.8 minutes and a mixing time in the second addition process to 2 minutes.

Example 16

In Example 16, which has a resistance value change D of −2, externally-added toner was obtained in the same manner as in Examples 8 and 12 except for changing a mixing time in the first addition process to 2.5 minutes and a mixing time in the second addition process to 2.8 minutes.

Example 21

In Example 21, externally-added toner was obtained in the same manner as in Example 12, except for using fine powder derived by changing the mixing ratio of Solution 1, Solution 2 and Solution 3 in the item (2) of the above-mentioned procedure for producing fine powder so as to provide a molar ratio of (Sr+Si)/Ti of 1.18.

Example 22

In Example 22, externally-added toner was obtained in the same manner as in Example 12, except for using fine powder derived by changing the mixing ratio of Solution 1, Solution 2 and Solution 3 in the item (2) of the above-mentioned procedure for producing fine powder so as to provide a molar ratio of (Sr+Si)/Ti of 2.10.

Example 23

In Example 23, externally-added toner was obtained in the same manner as in Example 12, except for using fine powder derived by changing the mixing ratio of Solution 1, Solution 2 and Solution 3 in the item (2) of the above-mentioned procedure for producing fine powder was changed so as to provide a molar ratio of (Sr+Si)/Ti of 1.16.

Example 24

In Example 24, externally-added toner was obtained in the same manner as in Example 12, except for using fine powder derived by changing the mixing ratio of Solution 1, Solution 2 and Solution 3 in the item (2) of the above-mentioned procedure for producing fine powder so as to provide a molar ratio of (Sr+Si)/Ti of 2.16.

Comparative Example 1-8

In Comparative Examples 1-8, strontium titanate was used as an external additive instead of fine powder in which the surface of a core derived by addition of silica to strontium titanate was hydrophobized with a silane compound, and moreover, the number of added parts of the external additive was changed to that calculated with the formula (3) described above so as to provide a coverage with the value shown in Table 1. Externally added toner was obtained in the same manner as in Examples 8 and 12 except for those as described above.

Production of Carrier

Ten mass parts of PTFE (manufactured by Daikin Industries, Ltd., product name: LDE-410) was added as fluororesin microparticles to 100 parts by weight of a silicone resin to prepare a resin solution, and a carrier core material was immersed in the resin solution, thereby obtaining carrier "SC-1".

As well, 12 mass parts of PTFE (manufactured by Daikin Industries, Ltd., product name: LDE-410) was added as fluororesin microparticles to 100 parts by weight of a silicone resin to prepare a resin solution, and a carrier core material was immersed in the resin solution, thereby obtaining carrier "SC-2".

Measurement of Current Value in Application of Voltage from the End of Carrier Magnetic Chain to the Opposite End A jig was used in which two stainless steel plates with a thickness of 1 mm were placed in parallel with a 1 mm interval on a base made of phenolic resin. The 0.2 g of the carrier thus obtained was placed between the two stainless steel plates, and sandwiched between two anisotropic ferrite magnets of 100 mTesla with N and S poles facing each other from the outside of the stainless steel plates to form a magnetic chain of the carrier between the stainless steel plates. The two stainless steel plates were wired and connected to an electrometer (manufactured by Advantest Corporation, model: R8340) to measure a current value at application of 300 V.

The current value of carrier "SC-1" was 10 μA and the current value of carrier "SC-2" was 8 μA.

Preparation of Developer

In Examples 1-10, 13-20, and Comparative Examples 1-6, a two-component developer was prepared by mixing the externally-added toner thus obtained and carrier "SC-1" in a V-type mixer (manufactured by Tokuju Corporation, model: V-5) for 20 minutes so as to provide a toner concentration of 7% by mass.

In Examples 11-12, 21-24, and Comparative Examples 7-8, a two-component developer was prepared by mixing the externally-added toner thus obtained and carrier "SC-2" in a V-type mixer (manufactured by Tokuju Corporation, model: V-5) for 20 minutes so as to provide a toner concentration of 7% by mass.

A list of the evaluation results in the toners and the developers according to the Examples and Comparative Examples prepared in this manner is shown in Table 1 below.

TABLE 1

| | Si/Ti molar ratio | Coverage | | | Adhesion strength | | | Adhesion strength ratio A | Resistance change D | Type of carrier | Fog in high humidity | | | |
|---|---|---|---|---|---|---|---|---|---|---|---|---|---|---|
| | | Silica | Fine powder | Strontium titanate | Silica | Fine powder | Strontium titanate | | | | 1st sheet | | 10,000th sheet | |
| Example 1 | 0.05 | 35% | 2% | — | 78% | 84% | — | 0.9 | −10 | SC-1 | 95% | + | 88% | ++ |
| Example 2 | 0.05 | 35% | 10% | — | 80% | 86% | — | 0.9 | −10 | SC-1 | 93% | + | 91% | + |
| Example 3 | 0.05 | 40% | 2% | — | 80% | 86% | — | 0.9 | −10 | SC-1 | 88% | ++ | 85% | ++ |
| Example 4 | 0.05 | 40% | 10% | — | 80% | 85% | — | 0.9 | −10 | SC-1 | 85% | ++ | 82% | ++ |
| Example 5 | 0.05 | 90% | 2% | — | 76% | 86% | — | 0.9 | −10 | SC-1 | 82% | ++ | 80% | +++ |
| Example 6 | 0.05 | 90% | 2% | — | 99% | 83% | — | 1.2 | −10 | SC-1 | 92% | + | 80% | +++ |
| Example 7 | 0.05 | 90% | 2% | — | 72% | 80% | — | 0.9 | −10 | SC-1 | 82% | ++ | 80% | +++ |
| Example 8 | 0.05 | 90% | 10% | — | 79% | 84% | — | 0.9 | −10 | SC-1 | 82% | ++ | 78% | +++ |
| Example 9 | 0.05 | 90% | 1% | — | 80% | 86% | — | 0.9 | −10 | SC-1 | 82% | ++ | 82% | ++ |
| Example 10 | 0.05 | 90% | 11% | — | 78% | 84% | — | 0.9 | −10 | SC-1 | 95% | + | 82% | ++ |
| Example 11 | 0.05 | 90% | 2% | — | 77% | 84% | — | 0.9 | −10 | SC-2 | 45% | +++ | 65% | +++ |
| Example 12 | 0.05 | 90% | 10% | — | 77% | 84% | — | 0.9 | −10 | SC-2 | 44% | +++ | 38% | +++ |
| Example 13 | 0.05 | 90% | 2% | — | 92% | 84% | — | 1.1 | −10 | SC-1 | 85% | ++ | 80% | +++ |
| Example 14 | 0.05 | 90% | 2% | — | 52% | 87% | — | 0.6 | −10 | SC-1 | 91% | + | 80% | +++ |
| Example 15 | 0.05 | 90% | 2% | — | 76% | 84% | — | 0.9 | −9 | SC-1 | 83% | ++ | 80% | +++ |
| Example 16 | 0.05 | 90% | 2% | — | 83% | 92% | — | 0.9 | −2 | SC-1 | 89% | ++ | 80% | +++ |
| Example 17 | 0.05 | 88% | 4% | — | 79% | 84% | — | 0.9 | −10 | SC-1 | 81% | ++ | 80% | +++ |
| Example 18 | 0.05 | 92% | 8% | — | 76% | 84% | — | 0.9 | −10 | SC-1 | 83% | ++ | 78% | +++ |
| Example 19 | 0.05 | 60% | 10% | — | 77% | 86% | — | 0.9 | −10 | SC-1 | 83% | ++ | 81% | ++ |
| Example 20 | 0.05 | 80% | 10% | — | 79% | 85% | — | 0.9 | −10 | SC-1 | 81% | ++ | 78% | +++ |
| Example 21 | 0.03 | 90% | 10% | — | 77% | 85% | — | 0.9 | −10 | SC-2 | 85% | ++ | 60% | +++ |
| Example 22 | 0.95 | 90% | 10% | — | 77% | 87% | — | 0.9 | −10 | SC-2 | 70% | +++ | 65% | +++ |
| Example 23 | 0.01 | 90% | 10% | — | 77% | 85% | — | 0.9 | −10 | SC-2 | 99% | + | 60% | +++ |
| Example 24 | 1.00 | 90% | 10% | — | 77% | 70% | — | 1.1 | −10 | SC-2 | 65% | +++ | 55% | +++ |
| Comparative Example 1 | — | 35% | — | 2% | 78% | — | 86% | 0.9 | −10 | SC-1 | 110% | − | 98% | ++ |
| Comparative Example 2 | — | 35% | — | 10% | 80% | — | 86% | 0.9 | −10 | SC-1 | 130% | − | 92% | ++ |
| Comparative Example 3 | — | 40% | — | 2% | 79% | — | 84% | 0.9 | −10 | SC-1 | 101% | − | 94% | ++ |
| Comparative Example 4 | — | 40% | — | 10% | 76% | — | 84% | 0.9 | −10 | SC-1 | 125% | − | 82% | ++ |
| Comparative Example 5 | — | 90% | — | 2% | 77% | — | 85% | 0.9 | −10 | SC-1 | 92% | + | 82% | ++ |

TABLE 1-continued

| | | | | | | | | | | | | | | |
|---|---|---|---|---|---|---|---|---|---|---|---|---|---|---|
| Comparative Example 6 | — | 90% | — | 10% | 77% | — | 86% | 0.9 | −10 | SC-1 | 120% | − | 65% | +++ |
| Comparative Example 7 | — | 90% | — | 2% | 78% | — | 85% | 0.9 | −10 | SC-2 | 42% | +++ | 60% | +++ |
| Comparative Example 8 | — | 90% | — | 10% | 78% | — | 86% | 0.9 | −10 | SC-2 | 120% | − | 65% | +++ |

| | Fog in low humidity | | | | Overall |
|---|---|---|---|---|---|
| | 1st sheet | | 10,000th sheet | | judgement |
| Example 1 | 82% | ++ | 89% | ++ | + |
| Example 2 | 85% | ++ | 88% | ++ | + |
| Example 3 | 60% | +++ | 79% | +++ | ++ |
| Example 4 | 81% | ++ | 40% | +++ | ++ |
| Example 5 | 50% | +++ | 81% | ++ | ++ |
| Example 6 | 50% | +++ | 79% | +++ | + |
| Example 7 | 70% | +++ | 95% | + | + |
| Example 8 | 78% | +++ | 40% | +++ | +++ |
| Example 9 | 81% | ++ | 95% | + | + |
| Example 10 | 60% | +++ | 40% | +++ | + |
| Example 11 | 50% | +++ | 82% | ++ | +++ |
| Example 12 | 80% | +++ | 42% | +++ | +++ |
| Example 13 | 50% | +++ | 81% | ++ | ++ |
| Example 14 | 60% | +++ | 83% | ++ | + |
| Example 15 | 60% | +++ | 79% | +++ | +++ |
| Example 16 | 60% | +++ | 83% | ++ | ++ |
| Example 17 | 50% | +++ | 83% | ++ | ++ |
| Example 18 | 78% | +++ | 35% | +++ | +++ |
| Example 19 | 83% | ++ | 43% | +++ | ++ |
| Example 20 | 81% | ++ | 46% | +++ | ++ |
| Example 21 | 85% | ++ | 50% | +++ | ++ |
| Example 22 | 90% | ++ | 89% | ++ | ++ |
| Example 23 | 95% | + | 40% | +++ | + |
| Example 24 | 95% | + | 99% | + | + |
| Comparative Example 1 | 58% | +++ | 90% | ++ | − |
| Comparative Example 2 | 88% | ++ | 40% | +++ | − |
| Comparative Example 3 | 60% | +++ | 102% | − | − |
| Comparative Example 4 | 90% | ++ | 40% | +++ | − |
| Comparative Example 5 | 60% | +++ | 110% | − | − |
| Comparative Example 6 | 105% | − | 40% | +++ | − |
| Comparative Example 7 | 65% | +++ | 120% | − | − |
| Comparative Example 8 | 105% | − | 40% | +++ | − |

As is apparent from Table 1, the toners and developers of Examples 1-24 containing fine powder in which the surface of a core derived by addition of silica to strontium titanate was hydrophobized with a silane compound, and silica as external additives had excellent ratings of fog values under both low-humidity and high-humidity environments.

By contrast, Comparative Examples 1-8, which do not satisfy these requirements, had inferior ratings of fog values relative to the Examples under at least one of low-humidity and high-humidity environments.

Figure 2:
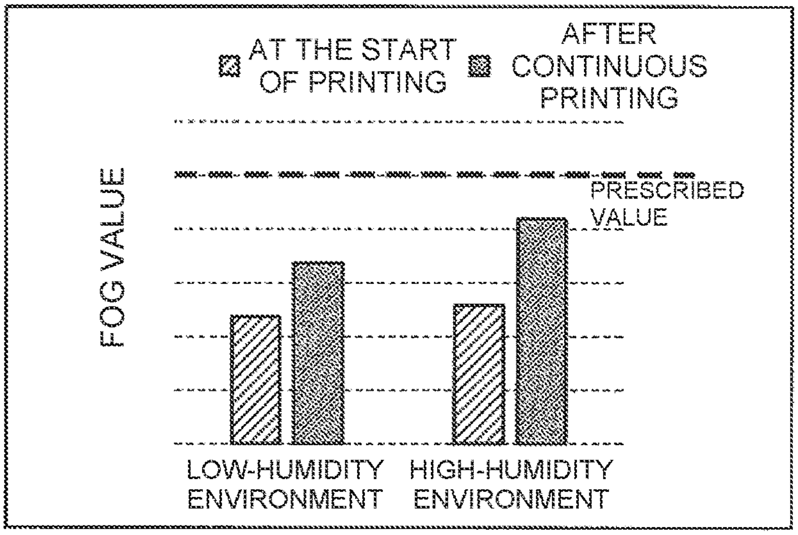
FIG. 2 shows fog values in use of silica-added strontium titanate as a charge adjuster.
Figure 2:
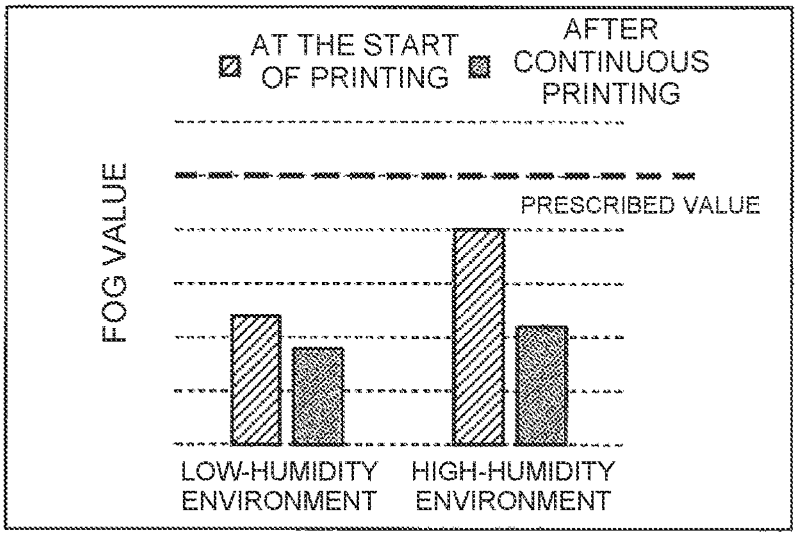

Moreover, for example, referring to Examples 11 and 12, it can be seen that both Example 11, which has a low coverage of the fine powder in which the surface of a core derived by addition of silica to strontium titanate is hydrophobized with a silane compound (a reduced additive amount of the fine powder), and Example 12, which has a high coverage of the fine powder (an increased additive amount of the fine powder), exhibited excellent ratings of fog values under both low-humidity and high-humidity environments. In other words, Example 11 corresponds to a case with a reduced additive amount of a charge adjuster in FIG. 2, and Example 12 corresponds to a case with an increased additive amount of a charge adjuster. Here, the type, additive amount, and the like of silica added together with a charge adjuster (silica that is not a part of the fine powder) are the same in reducing and increasing the additive amount of the charge adjuster in FIG. 2.

By contrast, referring to Comparative Examples 7 and 8, it can be seen that Comparative Example 7, which has a low coverage of strontium titanate (a reduced additive amount of strontium titanate), exhibited a rating of "–" for the 10,000th sheet under a low-humidity environment, and that Comparative Example 8, which has a high coverage of strontium titanate (an increased additive amount of strontium titanate), exhibited a rating of "–" for the first sheet under a high-humidity environment. In other words, Comparative Example 7 corresponds to a case with reduction in a charge adjuster in FIG. 1, and Example 8 corresponds to a case with increase in a charge adjuster. Here, the type, additive amount, and the like of silica added together with the charge adjuster (silica that is not a part of the fine powder) are the same in reducing and increasing the additive amount of the charge adjuster in FIG. 1.

Next, focusing on a ratio of adhesion strength A, it can be seen that Example 6, which has A more than 1.1, exhibited a rating of "+" for the first sheet under a high-humidity environment. By contrast, it can be seen that Example 13, which has A within the range of 0.7 or more to 1.1 or less, improved a rating for the first sheet under a high-humidity environment from "+" to "++" as compared with Example 6.

Moreover, it can be seen that Example 14, which has A less than 0.7, exhibited a rating of "+" for the first sheet under a high-humidity environment. By contrast, it can be seen that Example 5, which has A within the range of 0.7 or more to 1.1 or less, improves a rating for the first sheet under a high-humidity environment from "+" to "++" as compared with Example 14.

Furthermore, focusing on resistance value change D, it can be seen that Example 7, which has D less than −10, exhibited a rating of "+" for the 10,000th sheet under a low-humidity environment. By contrast, it can be seen that Example 15, which has D within the range of −10 or more to −3 or less, improved a rating for the 10,000th sheet under a low-humidity environment from "+" to "+++" as compared with Example 7.

In addition, it can be seen that Example 16, which has D more than −3, and Example 5, which has D within −10 or more to −3 or less, exhibited the same rating "++" for the 10,000th sheet under a low-humidity environment, but Example 5 improved a fog value as compared with Example 16.

Examples 21-24 were derived by changing the additive amount of silica in fine powder in which the surface of a core derived by addition of silica to strontium titanate is hydrophobized with a silane compound, from that of Example 12.

Examples 21 and 23, which have a reduced additive amount of silica from Example 12, include fine powder in an angular shape and tend to have albeit slightly higher adhesion strength of fine powder. By contrast, Examples 22 and 24, which have an increased additive amount of silica from Example 12, include fine powder in a rounded-off shape and tend to have albeit slightly lower adhesion strength of fine powder. Additionally, powder resistivity tends to increase as the content of silica in fine powder is increased, but no change in resistance value change D appears in the range of Examples 21-24 (in the range of Si/Ti of 0.03-1.0).

Focusing on Examples 12, 21, and 23, it can be seen that Examples 12 and 21, which have a Si/Ti of 0.03 or more, exhibits an excellent rating for the first sheet particularly under a high-humidity environment, as compared with Example 23, which has a Si/Ti of 0.01.

Moreover, focusing on Examples 12, 22, and 24, it can be seen that Examples 12 and 22, which have a Si/Ti of less than 1.0, exhibits an excellent rating for the 10,000th sheet particularly under a low-humidity environment, as compared with Example 24, which has a Si/Ti of 1.0.

Example 24, which has an increased additive amount of silica to fine powder, increases in roundness through precipitation of silica on the surface of fine powder and thus formation of a particle shape, and decreases in adhesion strength of the fine powder. It can be seen that increase in the additive amount of silica to the fine powder and precipitation of silica onto the surface of the fine powder causes further increase in negative chargeability, and significant elevation of a fog value under a low-humidity environment in Example 24.

Other Embodiments

Additionally, the embodiments disclosed herein are exemplifications in all points, and never provide a basis for limited interpretation. Accordingly, the technical scope of the present invention is not construed only by the embodiments described above, but defined on the basis of the recitation of the claims. The technical scope of the present invention also includes all alterations within the spirit and scope of the claims and equivalents thereof.

What is claimed is:

1. A toner including an external additive adhering to a surface of a toner particle, wherein the external additive comprises fine powder and silica, wherein the fine powder comprises a surface of a core hydrophobized with a silane compound, and wherein the core is derived by addition of silica to strontium titanate.

2. The toner according to claim 1, wherein a molar ratio of silicon to titanium Si/Ti in the fine powder is 0.03 or more to less than 1.0.

3. The toner according to claim 1, wherein a coverage with the fine powder on the surface of the toner particle is preferably 2% or more to 10% or less.

4. The toner according to claim 1, wherein a coverage with the silica on the surface of the toner particle is 40% or more, and wherein a sum of the coverage with the silica and a coverage with the fine powder on the surface of the toner particle is 100% or less.

5. The toner according to claim 1, wherein ratio A is 1.1 or less, the ratio A being a ratio of an adhesion strength of the fine powder to an adhesion strength of the silica as calculated by the following formula (1):

$$A = (\text{Adhesion strength of the silica})/(\text{Adhesion strength of the fine powder}) \quad (1).$$

6. The toner according to claim 1, wherein resistance value change of toner D is −10 or more, the resistance value change of toner D being calculated by the following formula (2):

$$D = (B - C)/(b - c) \quad (2)$$

wherein in formula (2), B is a resistance value of the toner (GΩ) when b mass parts of the fine powder is added to 100 mass parts of the toner particles, and C is a resistance value of the toner (GΩ) when c mass parts of the fine powder is added to 100 mass parts of the toner particles.

7. The toner according to claim 1, wherein a mean primary particle diameter of the fine powder is 20 nm or more to 60 nm or less.

8. A developer comprising the toner according to claim 1 and a carrier, wherein the developer has a current value of 10 μA or less upon application of a voltage of 300 V from an end of a carrier magnetic chain of 1 mm in length to the opposite end.

* * * * *